(12) United States Patent
Schaltegger

(10) Patent No.: US 11,725,739 B2
(45) Date of Patent: Aug. 15, 2023

(54) VALVE PLATE FOR SEALING A VALVE OPENING OF A VACUUM VALVE

(71) Applicant: VAT Holding AG, Haag (CH)

(72) Inventor: Lukas Schaltegger, Grabs (CH)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 17/832,876

(22) Filed: Jun. 6, 2022

(65) Prior Publication Data
US 2022/0390021 A1 Dec. 8, 2022

(30) Foreign Application Priority Data
Jun. 4, 2021 (DE) .......................... 102021114421.3

(51) Int. Cl.
| | |
|---|---|
| *F16K 3/314* | (2006.01) |
| *F16K 27/04* | (2006.01) |
| *F16K 51/02* | (2006.01) |
| *F16K 3/18* | (2006.01) |

(52) U.S. Cl.
CPC .............. *F16K 3/314* (2013.01); *F16K 3/188* (2013.01); *F16K 27/044* (2013.01); *F16K 51/02* (2013.01)

(58) Field of Classification Search
CPC ........ F16K 3/314; F16K 27/044; F16K 51/02; F16K 3/188
USPC ................................. 251/193, 195, 326–329
See application file for complete search history.

(56) References Cited

U.S. PATENT DOCUMENTS

| | | | |
|---|---|---|---|
| 5,123,770 A | | 6/1992 | Trenner |
| 6,079,693 A | * | 6/2000 | Ettinger ................... F16K 3/188 251/195 |
| 6,082,706 A | * | 7/2000 | Irie .......................... F16K 3/184 251/158 |
| 7,066,443 B2 | * | 6/2006 | Ishigaki ................... F16K 3/184 251/195 |
| 8,511,642 B2 | | 8/2013 | Schoch et al. |

(Continued)

FOREIGN PATENT DOCUMENTS

| | | |
|---|---|---|
| EP | 3754239 | 12/2020 |
| JP | H11-2360 A | 1/1999 |

(Continued)

OTHER PUBLICATIONS

German Office Action dated Apr. 6, 2022 for German Patent Application No. 10 2021 114 421.3 with translation of p. 2 of 6.

*Primary Examiner* — John Bastianelli
(74) *Attorney, Agent, or Firm* — Volpe Koenig

(57) ABSTRACT

A sealing ring made of an elastomer material is fitted on the front side of an essentially rectangular valve plate for sealing a vacuum valve opening. On the rear side, the valve plate has a recess with an undercut boundary wall which forms a sloping surface which, for fastening the valve plate on a carrier, is braced with a sloping surface of the carrier. The valve plate has a lug which protrudes beyond the rear side thereof and has a through-passage bore through which a clamping screw is screwable into a threaded bore of the carrier, for bracing the valve plate sloping surface with the carrier sloping surface. In a side view of the valve plate, seen parallel to the longitudinal sides, the straight-line extension of the longitudinal center axis of the through-passage bore runs past the sloping surface at a distance from the rear side of the valve plate.

15 Claims, 7 Drawing Sheets

(56) References Cited

U.S. PATENT DOCUMENTS 9,957,745 B2 * 5/2018 Ehrne ...................... E05F 5/08
2004/0129910 A1 7/2004 Ishigaki

FOREIGN PATENT DOCUMENTS

| JP | 2005291221 | 10/2005 |
| JP | 2017015172 | 1/2017 |

* cited by examiner

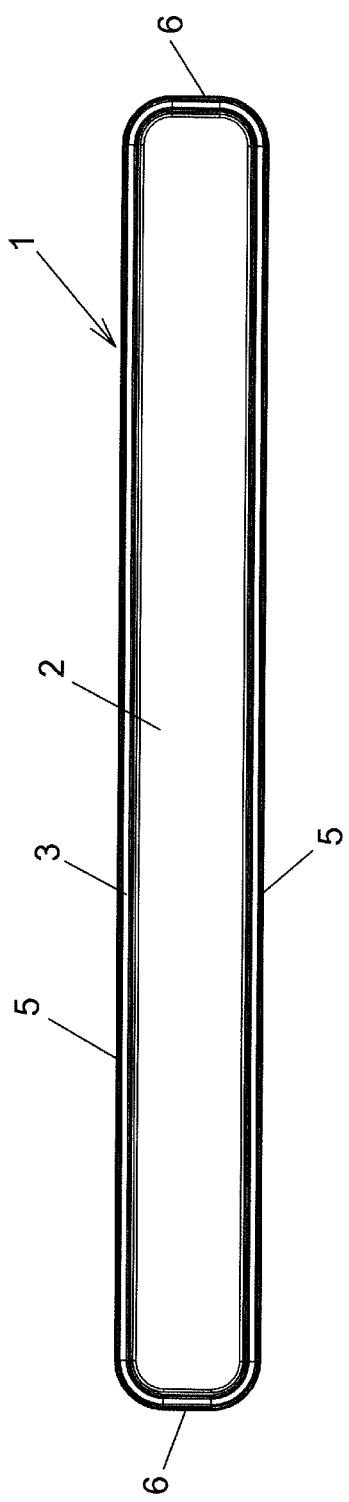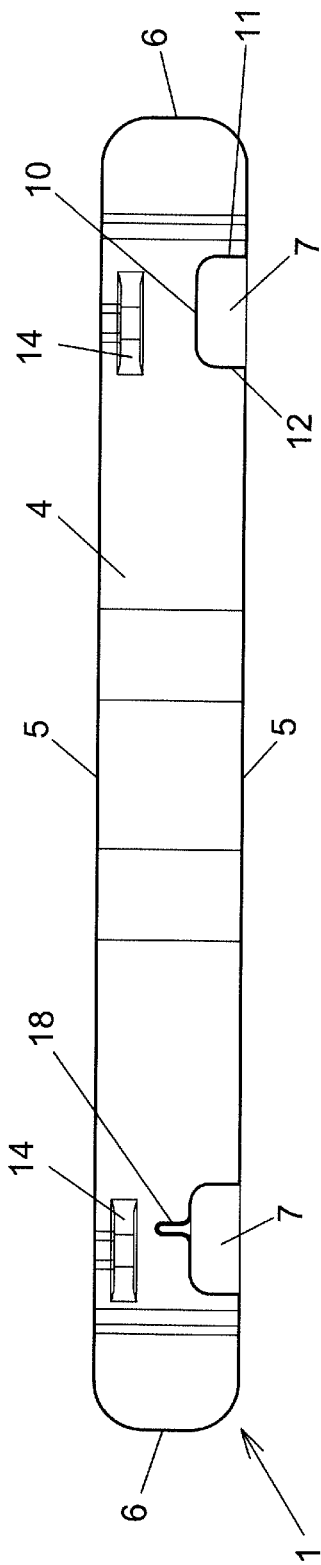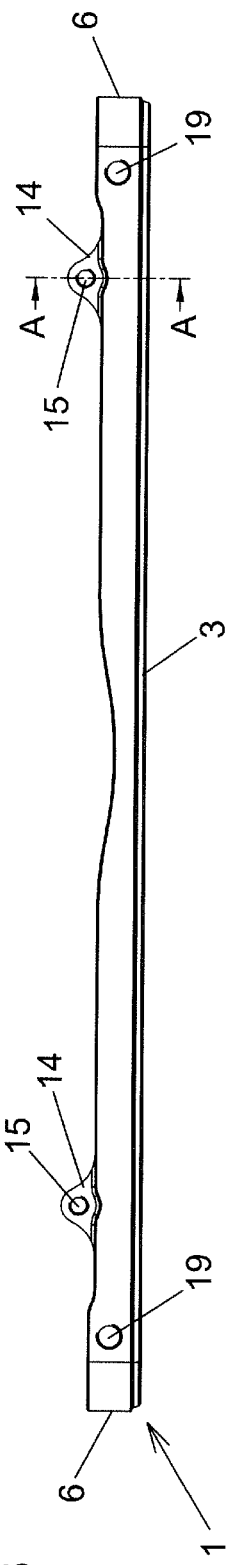

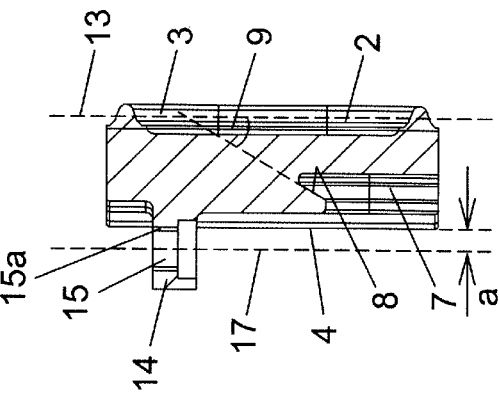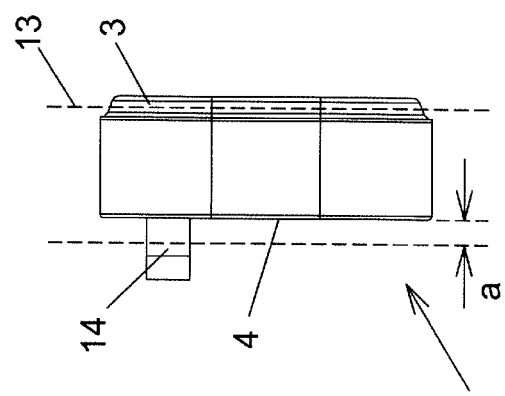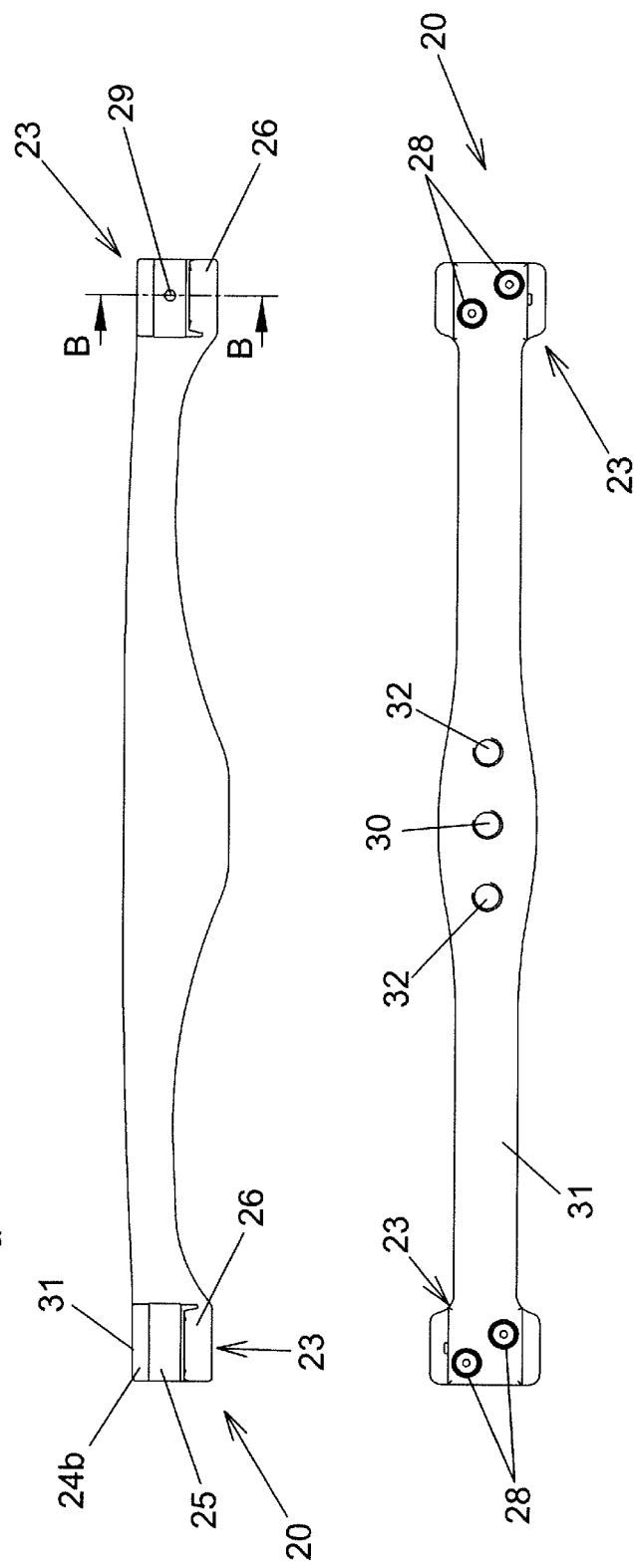

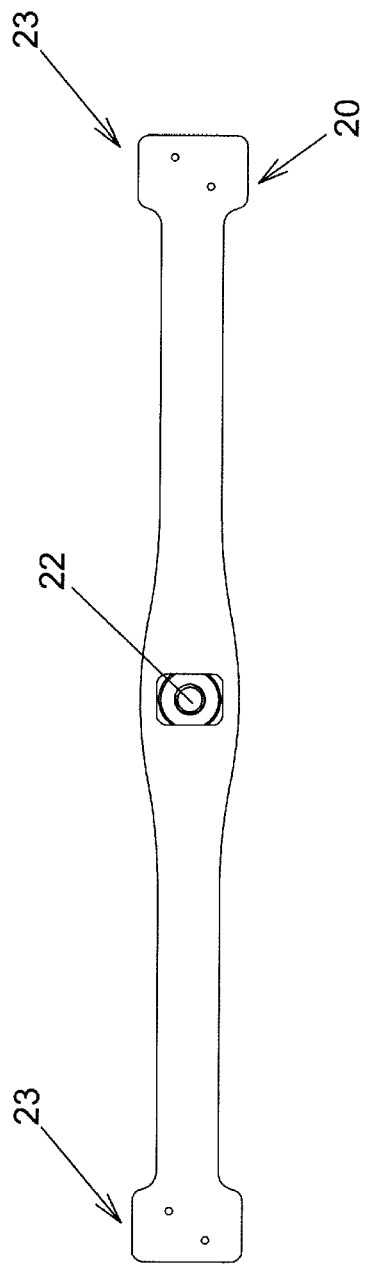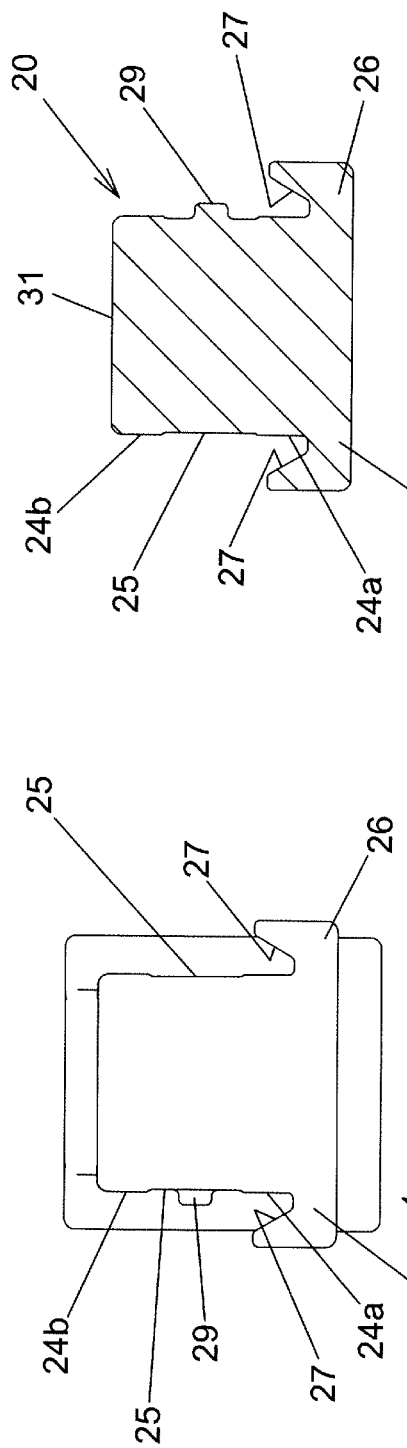

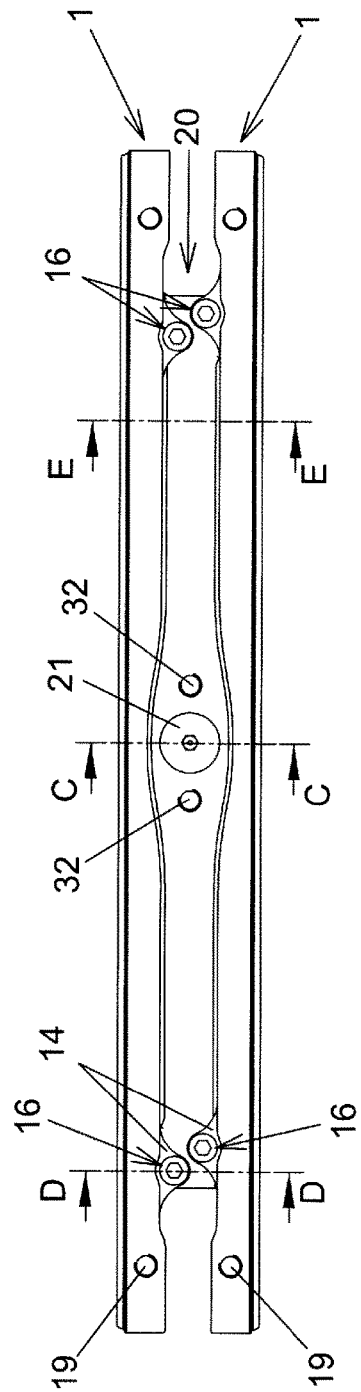
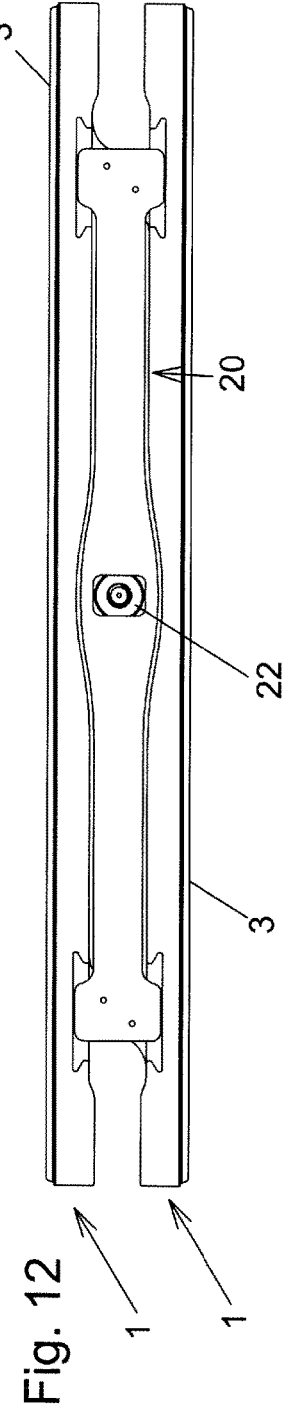
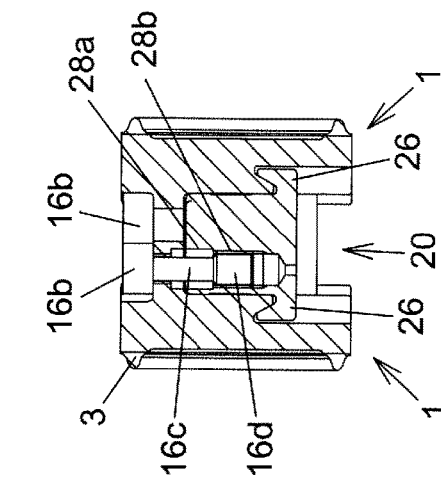
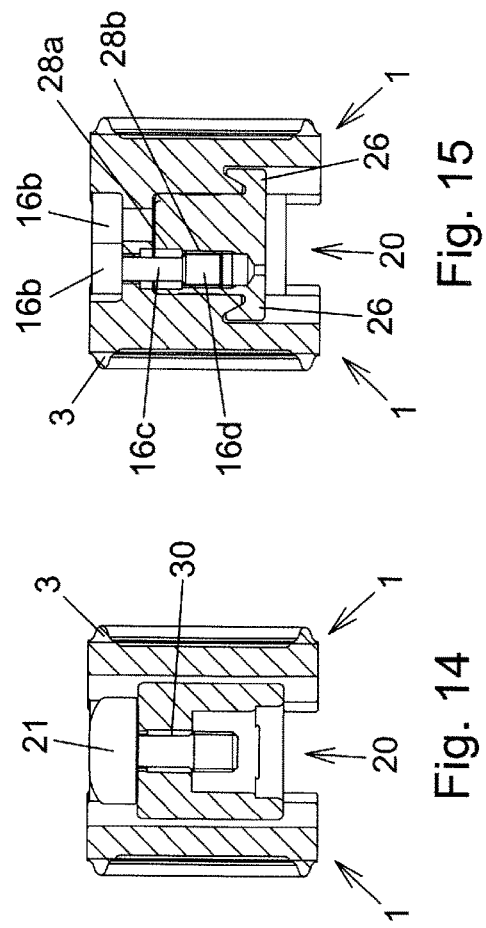
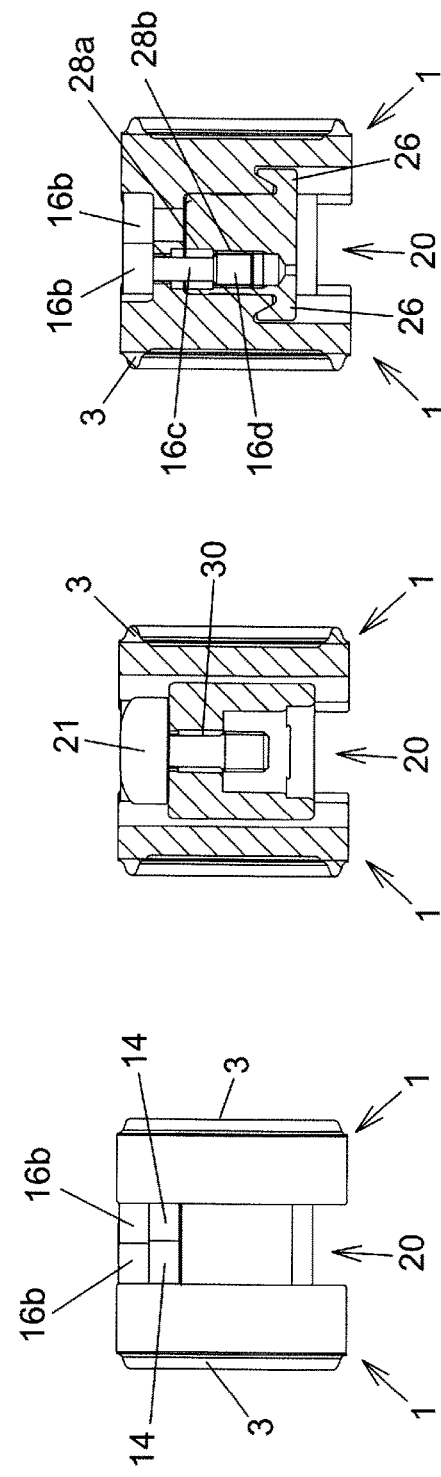

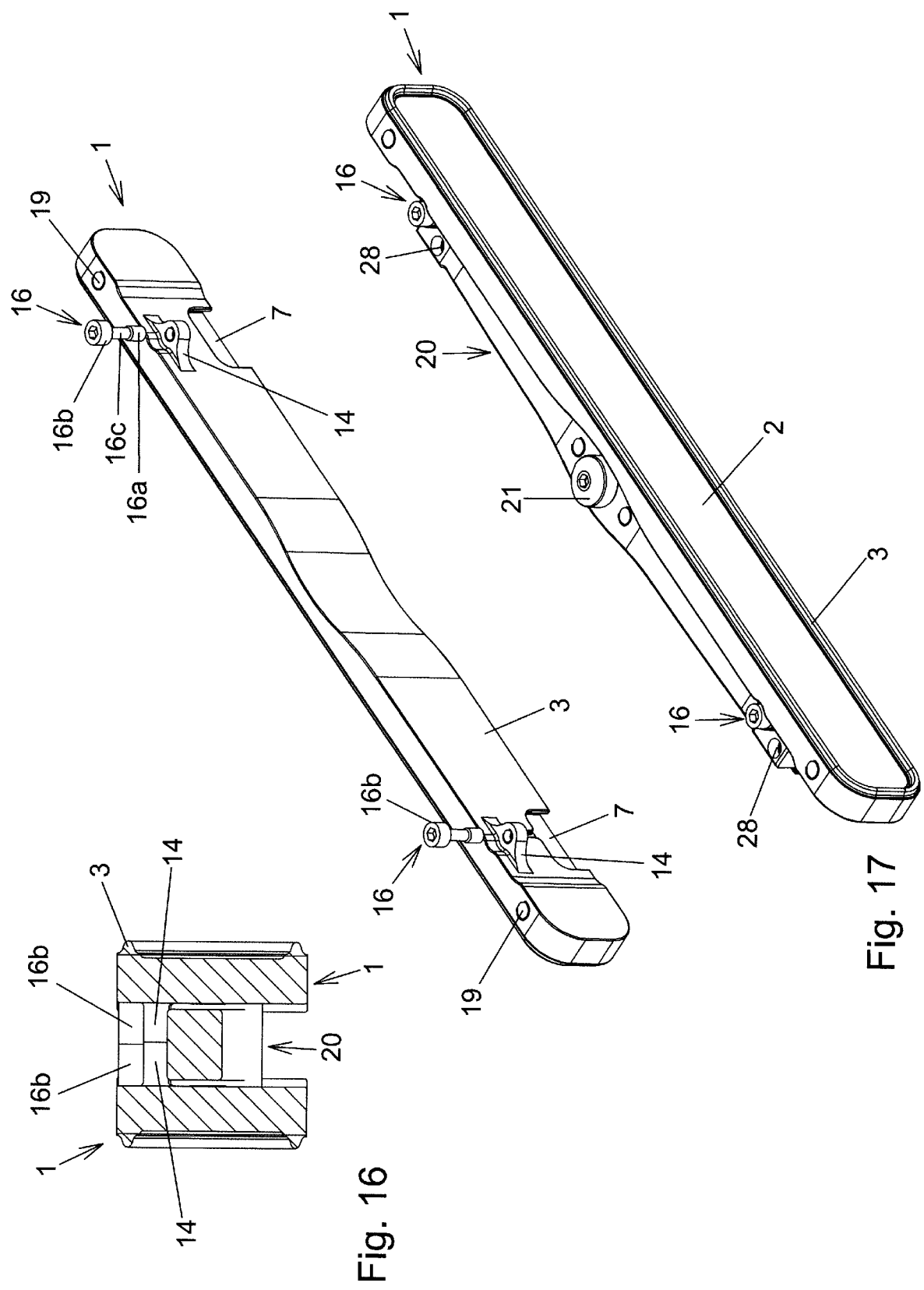

VALVE PLATE FOR SEALING A VALVE OPENING OF A VACUUM VALVE

INCORPORATION BY REFERENCE

The following documents are incorporated herein by reference as if fully set forth: German Patent Appln. No. DE 10 2021 114 421.3, filed Jun. 4, 2021.

TECHNICAL FIELD

The invention relates to a valve plate which is intended for sealing a valve opening of a vacuum valve and is of at least essentially rectangular shape with relatively long longitudinal sides and relatively short narrow sides, wherein a sealing ring made of an elastomer material is fitted on a front side of the valve plate for the purpose of sealing the valve plate in relation to a sealing seat which encloses the valve opening and, on a rear side, the valve plate has at least one recess with an undercut boundary wall which forms a sloping surface which, for the purpose of fastening the valve plate on a carrier, can be braced with a sloping surface of the carrier.

BACKGROUND

A valve plate of this type can be found in U.S. Pat. No. 8,511,642 B2. Two such valve plates are fitted on opposite sides of a carrier in order to form a closure unit of a vacuum valve. Clamping pieces are provided in order to brace the sloping surfaces of the valve plates with sloping surfaces of the carrier. These clamping pieces are screwed on a narrow side of the carrier, wherein a respective clamping piece likewise has a sloping surface which interacts with a further sloping surface of the respective valve plate. Interaction of the sloping surfaces of the valve plates with the sloping surfaces of the carrier and with the sloping surfaces of the clamping pieces causes the valve plates to be pulled against the carrier and connected rigidly thereto. Furthermore, a respective valve plate can be pushed on the carrier via a kind of dovetail guide, as a result of which the valve plate is held in captive fashion in relation to the carrier during installation and the valve plate is also positioned laterally (=position in relation to the direction of the longitudinal sides of the valve plate). Although the valve plates are held, and positioned, in a reliable manner, this design, inter alia in view of the number of separate clamping pieces, is associated with relatively high outlay in terms of production and installation.

SUMMARY

'The object of the invention is to provide an advantageous valve plate of the type mentioned in the introduction which can be installed on a carrier, and removed from the same, in a straightforward and reliable manner. This is achieved according a valve plate having one or more of the features described herein.

The invention makes provision for the rear side of the valve plate to have fitted on it at least one lug, which protrudes beyond the rear side of the valve plate and has a through-passage bore through which to guide a clamping screw, which can be screwed into a threaded bore of the carrier, for the purpose of bracing the at least one sloping surface of the valve plate with the at least one sloping surface of the carrier. The design here is such that in a side view of the valve plate, as seen in a viewing direction parallel to the longitudinal sides of the valve plate, the straight-line extension of the longitudinal center axis of the through-passage bore, which runs through the lug, runs past the sloping the surface at a distance from the rear side of the valve plate.

When the valve plate is placed, by way of its at least one sloping surface, on the at least one sloping surface of the carrier and a clamping screw, which is guided through the through-passage bore of the at least one lug, is screwed into a threaded bore of the carrier and clamped, this design gives rise to a tilting moment, as a result of which a portion of the rear side of the valve plate which, as seen in relation to the direction parallel to the narrow sides of the valve plate, is closer to the at least one lug than to the sloping surface of the valve plate is pushed against the carrier. This tilting moment, in conjunction with the sloping surfaces, therefore causes the valve plate to be pushed against the carrier in a play-free manner. This allows for very straightforward installation and removal without a large number of losable parts.

The at least one recess, which has a sloping surface, preferably extends from an edge of the valve plate which forms one of the longitudinal sides of the valve plate, wherein, on its edge located opposite this edge of the valve plate, the recess has the boundary wall which forms the sloping surface.

The valve plate advantageously has a first and a second recess, which, as seen in relation to the direction of the longitudinal sides of the valve plate, are spaced apart from one another.

The valve plate preferably has fitted on it first and second lugs, which, as seen in relation to the direction of the longitudinal sides of the valve plate, are spaced apart from one another, wherein it is preferably the case that the first recess and the first lug are arranged in the same first region of the longitudinal extent of the valve plate, and the second recess and second lug are arranged in the same second region of the longitudinal extent of the valve plate.

The valve plate preferably has a slot which extends from the recess or one of the recesses and runs parallel to the narrow sides of the valve plate, to be precise in the direction of that longitudinal side of the valve plate which is located opposite that longitudinal side of the valve plate from which the recess extends. This slot serves for interacting with a centering protuberance, which is arranged on the carrier and, when the valve plate is placed on the carrier, moves into the slot. The positioning of the valve plate as seen in relation to the direction of its longitudinal extent is fixed as a result.

A closure unit for a vacuum valve according to the invention has a carrier and at least one valve plate according to the invention, which is fastened on the carrier, wherein the sloping surface of the at least one recess of the valve plate and the at least one sloping surface of the carrier are braced with one another by means of at least one clamping screw, which is screwed into a threaded bore of the carrier. This threaded bore is preferably made in a narrow side of the carrier, which is at right angles to a side surface of the carrier against which the rear side of the valve plate is pushed.

The at least one sloping surface of the carrier is preferably arranged on a strip which protrudes beyond that side surface of the carrier against which the rear side of the valve plate is pushed.

One possible embodiment of the invention makes provision for a respective valve plate to be arranged on opposite sides of the carrier and to be pushed against the carrier.

A vacuum valve of the invention has a closure unit which is fitted on a valve stem and has at least one valve plate according to the invention.

BRIEF DESCRIPTION OF THE DRAWINGS

Further advantages and details of the invention will be explained hereinbelow with reference to the accompanying drawing, in which:

FIGS. 1 and 2 show a front view and a rear view of an exemplary embodiment of a valve plate according to the invention;

FIG. 3 shows a plan view;

FIG. 4 shows a side view;

FIG. 5 shows a cross section taken along line AA from FIG. 3;

FIG. 6 shows a front view (the rear view is identical) of a carrier for holding two valve plates according to the invention;

FIGS. 7 and 8 show a top view and a bottom view of the carrier;

FIG. 9 shows a side view of the carrier;

FIG. 10 shows a cross section taken along line BB from FIG. 6;

FIGS. 11 and 12 show a top view and a bottom view of a closure unit comprising the carrier and the valve plates, which are fitted on the carrier;

FIG. 13 shows a side view;

FIG. 14 shows a section taken along line CC from FIG. 11;

FIG. 15 shows a section taken along line DD from FIG. 11;

FIG. 16 shows a section taken along line EE from FIG. 11;

FIG. 17 shows a perspective view, with one of the valve plates removed from the carrier;

DETAILED DESCRIPTION

Figure 18:
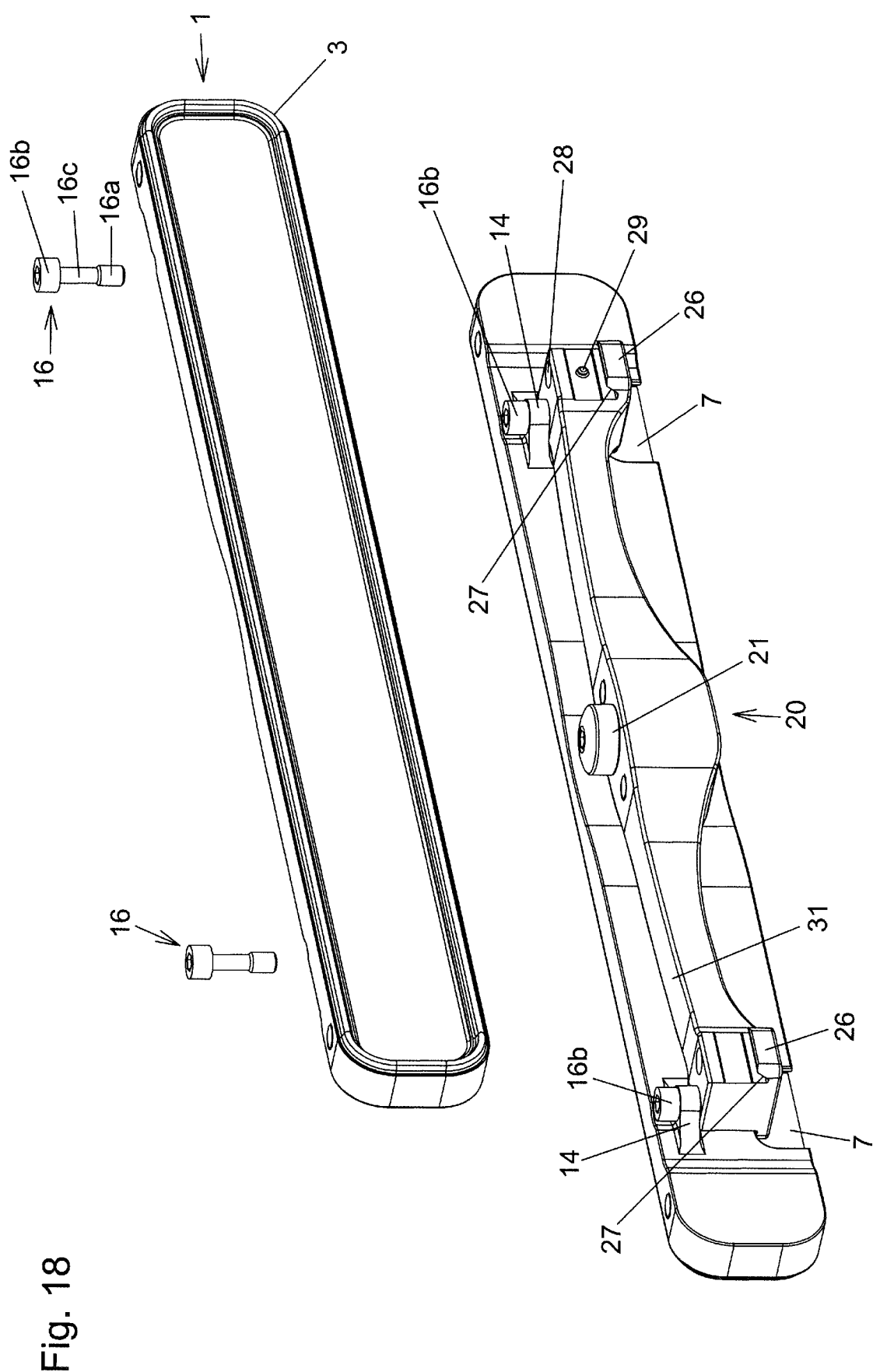
FIG. 18 shows a perspective view analogous to FIG. 17, but from a different viewing direction.

The figures show an exemplary embodiment of a valve plate according to the invention, and also a closure unit having two such valve plates, and also a vacuum valve having such a closure unit.

The valve plate 1 has a sealing ring 3 made of an elastomer material, the sealing ring being fitted on a front side 2 of the valve plate and being located in a plane 13.

The front side 2 and the rear side 4, which is located opposite the front side, form the large sides of the valve plate 1. In a side view of the front side of the valve plate (cf. FIG. 1), the valve plate is of at least essentially rectangular shape with relatively long longitudinal sides 5 and relatively short narrow sides 6. An "essentially" rectangular shape comprises, in particular, the valve plate being rectangular with rounded corners.

The longitudinal extent of the valve plate 1, this longitudinal extent running parallel to the longitudinal sides 5, is significantly greater than the extent of the valve plate parallel to the narrow sides 6, preferably more than three times the extent, and particularly preferably more than five times the extent.

The thickness of the valve plate is preferably smaller than the extent parallel to the narrow sides, preferably less than half the extent.

On the rear side 4 of the valve plate, two recesses 7 are spaced apart from one another, as seen in relation to the longitudinal extent of the valve plate 1. In the exemplary embodiment, a respective one of the recess 7 extends from an edge of the valve plate 1 which forms one of the longitudinal sides 5 of the valve plate 1. On the side located opposite this edge which forms the longitudinal side 5, the recess 7 is bounded by an undercut boundary wall, i.e. that extent of the recess 7 which is measured parallel to the narrow side 6 of the valve plate 1 increases in the direction of the base of the recess. This boundary wall therefore forms a sloping surface 8.

The angle 9 which the sloping surface 8 encloses with the plane 13, and in which is located the sealing ring 3 (or its end abutment surface for butting against the valve seat), preferably ranges from 20° to 45°, for example is approximately 30°.

In a view of the rear side 4 of the valve plate 1 (FIG. 2), the recess edge 10 at which the sloping surface 8 terminates on the side remote from the base of the recess runs parallel to the longitudinal sides 5 of the valve plate 1. Between the edge 10 of the recess 7 and that edge of the valve plate which forms one of the longitudinal sides of the valve plate and from which the respective recess 7 extends, the recess is bounded by edges 11, 12, which run parallel to the narrow side 6 of the valve plate. The boundary walls of the recess 7 which form these edges 11, 12 are preferably at right angles to the plane 13 in which the sealing ring 3 is located.

The rear side 4 of the valve plate 1 has fitted on it two lugs 14, which project from the rear side 4 of the valve plate 1. These lugs 14 each have a through-passage bore 15 through which to guide a clamping screw 16, which can be screwed into a threaded bore of the carrier, which will be explained hereinbelow. The lugs 14 are spaced apart from one another in the direction of the longitudinal extent of the valve plate 1. In the exemplary embodiment, the first recess 7 and the first lug 14 are located in the same first region of the longitudinal extent of the valve plate, and the second recess 7 and the second lug 14 are located in the same second region of the longitudinal extent of the valve plate.

In a side view of the valve plate, as seen in a viewing direction parallel to the longitudinal sides 5 of the valve plate—such a view is shown in FIG. 4—or as seen in a vertical cross section through the valve plate—such a view is shown in FIG. 5—the straight-line extension of the longitudinal center axis 17 of the through-passage bore 15 of this lug 14 runs past the sloping surface 8 at a distance a from the rear side 4 of the valve plate.

The longitudinal center axis 17 of the through-passage bore 15 is preferably located parallel to the plane 13, in particular parallel to the narrow sides 6 of the valve plate 1.

As seen in a side view parallel to the longitudinal sides 5 of the valve plate (cf. FIG. 4), the lugs 14 preferably project at right angles from the rear side 4 of the valve plate.

A carrier 20, which can have a respective valve plate 1 according to the invention secured on opposite sides, is illustrated in FIGS. 6 to 10. The carrier 20 can be connected to a valve stem 40 in a central region via a connecting screw, wherein the valve stem 40 can be inserted into an aperture 22 of the carrier. The connecting screw can be screwed into a threaded bore of the valve stem 40 through the through-passage bore 30 of the carrier.

The carrier extends, in opposite directions, from the central region, in each case to a respective head portion 23. Connection to the valve plates 1 takes place in the head portions 23. A respective one of the head portions 23 has opposite side surfaces for butting against a respective valve plate 1. These side surfaces each have parallel surface-area portions 24a, 24b, which are located in a common plane and between which a recessed portion 25 is located. When the respective valve plate is in the installed state, the surface-area portions 24*a*, 24*b* are located parallel to the plane 13.

A respective protruding strip 26 projects from the respective head portion 23 on opposite sides. This strip has a sloping surface 27 for interacting with a respective sloping surface 8 of the respective valve plate 1. The surface-area portions 24*a* adjoin the sloping surfaces 27. The angle between the sloping surface 27 and the adjacent surface-area portion 24*a* corresponds to the angle 9 which the sloping surface 8 encloses with the plane 13.

An upper side of the carrier 20 is provided with threaded bores 28, into which to screw the clamping screw 16 ("top/upper" refers to that position of the carrier in which the valve plates are installed on the carrier). In the exemplary embodiment, this upper side adjoins the surface-area portion 24*b* and is at right angles to the surface-area portions 24*a*, 24*b*.

For the purpose of fastening a respective valve plate 1 on the carrier 20, the valve plate 1 is placed, by way of its sloping surfaces 8, on the sloping surfaces 27 of the strips 26 of the head portions 23 of the carrier and the clamping screws 16 are screwed into the threaded bores 28. Since the longitudinal center axes 17 of the through-passage bores 15 run past the sloping surfaces 8 of the valve plate 1 at a distance a from the valve plate 1, the abutment of the heads 16*b* of the clamping screw 16 against the lugs 14 gives rise to a tilting moment, as a result of which the rear side 4 of the valve plate is pushed against the surface-area portion 24*b* of the carrier 20. At the same time, the interacting sloping surfaces 8, 27 pull the rear side 4 of the valve plate onto the surface-area portion 24*a*. In the state in which the valve plate 1 is connected to the carrier 20, there is preferably full-surface-area abutment of the valve plate against the surface-area portions 24*a*, 24*b*, cf., in particular, FIG. 15.

A portion 16*c* of the respective clamping screw 16, this portion being located in the region of the through-passage bore 15, has such a large amount of play in relation to the through-passage bore 15 that, in the state in which the valve plate and the carrier are connected, this portion of the clamping screw 16 is spaced apart from the wall of the through-passage bore.

Even in the state in which a respective valve plate 1 has been removed from the carrier 20, the clamping screws 16 are held in captive fashion on the lugs. For this purpose, the clamping screws 16, in an end portion 16*a*, have a thread and, in the region between the end portion 16*a* and the head 16*b*, have a portion 16*c* with no thread, this portion having a smaller external diameter than the thread in the end portion 16*a*. The through-passage bores 15 of the lugs 14 have an internal thread 15*a*, through which the end portion 16*a* of the clamping screws 16 is screwed, whereupon the portion 16*c* of the clamping screw 16 ends up located in the region of the internal thread 15*a*, and the clamping screw 16*a* can be displaced, via the portion 16*c*, in relation to the region of the internal thread 15*a*.

In an analogous manner, the connecting screw 21 can be held in captive fashion on the carrier, as can be seen from FIG. 14.

The threaded bores 28, at the start, have a portion 28*a* with no thread; it is only in a lower-down portion 28*b* that they have an internal thread (cf. FIG. 15). The portion 28*a* has a diameter which is greater than the internal diameter of the thread of the portion 28*b*, and therefore the threaded end portion 16*a* of the clamping screw 16 can be pushed in through the portion 28*a* until it reaches the threaded portion 28*b* of the threaded bore 28. This makes it possible, during installation, for the clamping screws 16 to be introduced, by way of their end portions 16*a*, into the initial portions 28*a* of the threaded bores before being screwed into the threads in the portions 28*b* of the threaded bores. It is therefore the case that, even prior to the clamping screws being screwed into the threads of the threaded bores 28, the valve plate 1 is held on a provisional basis on the carrier 20, and this makes installation easier.

As can be seen from FIG. 5 and FIG. 15, the internal threads 15*a* can only extend over part of the length of the through-passage bores 15, and therefore the internal threads 15*a* are adjoined by a portion 15*b* with no internal thread and with an enlarged diameter. Together with the portion 28*a* of the threaded bores 28, this portion 15*b* can accommodate the end portion 16*a* of the respective clamping screw 16 prior to the clamping screw being screwed into the portion which has the thread 28*b*.

In order for the valve plate 1 to be positioned laterally, that is to say in relation to the direction of its longitudinal sides 5, the exemplary embodiment provides a slot 18 which extends from the edge 10 of one of the recesses 7 and runs in the direction of the opposite longitudinal side 5 of the valve plate 1. A centering protuberance 29 of the carrier 20 interacts with this slot 18, the centering protuberance being arranged on one of the head portions 23, in the exemplary embodiment in the region of the recess portion 25. When the valve plate 1 is placed on the carrier 20, the centering protuberance 29 moves into the slot 18 and fixes the lateral positioning of the valve plate 1.

The lugs 14 are at different distances from the narrow sides 6 of the valve plate, cf., for example, FIGS. 2 and 3. The threaded bores 28 are arranged correspondingly. The lugs of the valve plates 1 fitted on opposite sides of the carrier are therefore offset with respect to one another in each case as seen in relation to the longitudinal direction of the valve plate 1. This means that the width of the carrier 20 can be kept small.

It is possible here for the two valve plates 1, as is preferred, to be identical. The valve plates secured on the opposite sides of the carrier 20 have been pivoted in relation to one another through 180° about a center axis located parallel to the narrow sides 6 of the valve plate.

In the region between the two end-side head portions 23, the carrier 20, in the exemplary embodiment, is spaced apart from the rear side of the valve plate 1. This allows a certain amount of torsion (=twisting) of the carrier 20 about its longitudinal axis. This can therefore take place between the respective head portion 23 and the central region of attachment to the valve stem. As a result, the position of the valve plate 1 can be adapted, in respect of this axis, in relation to the valve seat of the vacuum valve, which means that more uniform pressing of the sealing ring 3 can be achieved when the vacuum valve is in the closed state.

However, it is also conceivable, and possible, to have exemplary embodiments which dispense with such a possibility for torsion of the carrier 20. It would also be possible here for such a strip with a sloping surface to be present in a central region of the longitudinal extent of the carrier and for the valve plate to have a corresponding recess with a sloping surface. It would also be possible, for example, for a single strip with a sloping surface to extend over the entire length of the carrier 20, or over much of the length of the carrier, and for the rear side of the valve plate to have a single recess 7 with a sloping surface 8 of a corresponding extent.

In order for the closure unit to be lifted out of the vacuum valve for a service, the carrier has, on the upper side 31, threaded service bores 32, into which screws of a hoisting device can be screwed.

It is also possible for the valve plates 1 to have such threaded service bores 19 on their upper sides.

Figure 19:
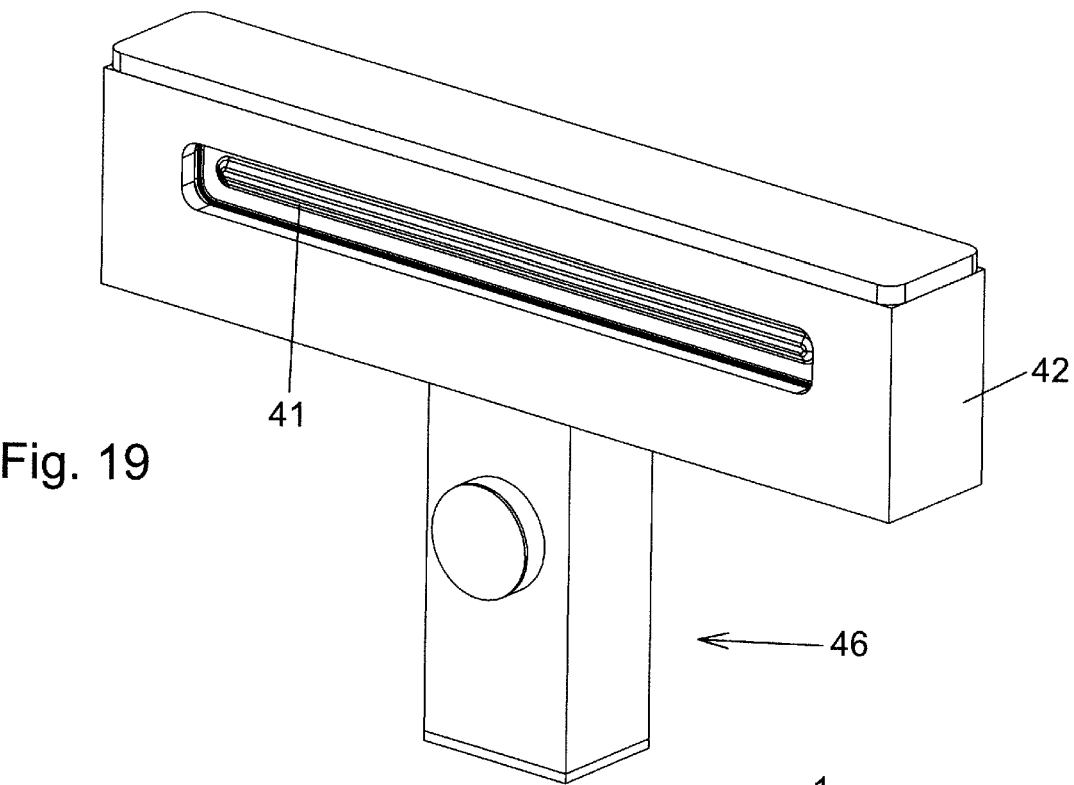
FIG. 19 shows a vacuum valve having a valve plate according to the invention (simplified)
Figure 20:
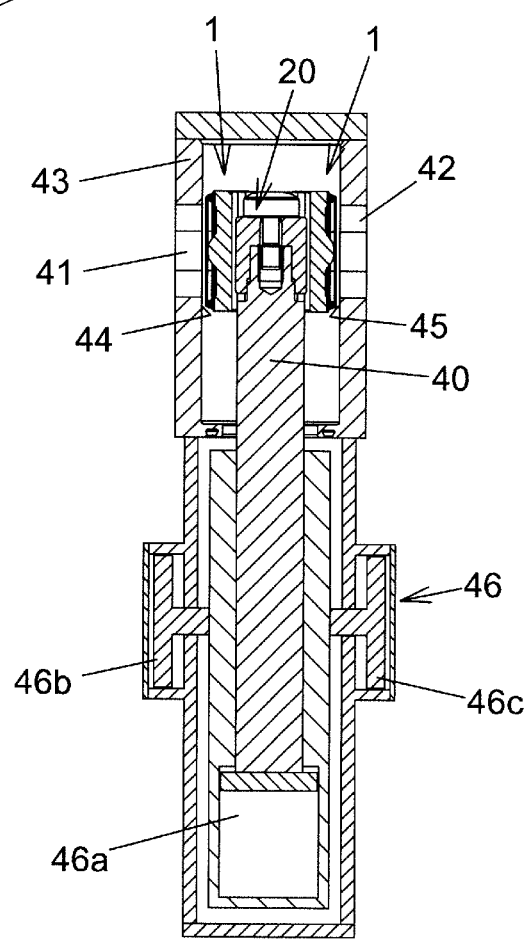
FIG. 20 shows a cross section through the vacuum valve (simplified).

A vacuum valve having such a closure unit is illustrated in a simplified state in FIGS. 19 and 20. The closure unit has been fitted on a valve stem 40, which can be adjusted by means of a valve drive 46. On the one hand, the valve stem 40 can be displaced parallel to its longitudinal extent so that, when the vacuum valve is in the open state, the valve plates are moved out of the region of a through-passage, through the vacuum valve, which extends between first and second valve openings 41, 42 of the valve housing 43.

In order for the valve to be closed, the valve plates 1 are moved, by adjustment of the valve stem 13 in its longitudinal direction, into a position in which they are located between the valve openings 41, 42, this position being illustrated in FIG. 20. In the exemplary embodiment, use is made, for this purpose, of a piston/cylinder unit 46a. The sealing rings 3 of the valve plates 1 here, however, are still raised up from the sealing surfaces which enclose the respective valve opening 41, 42 on the inner side of the valve housing 43. These sealing surfaces form valve seats 44, 45 of the vacuum valve.

In the exemplary embodiment, the valve stem 40 can be displaced, by the valve drive 46, at right angles to its longitudinal extent in order, starting from this position of the valve plates 1, to press one of the valve plates 1 onto one of these sealing surfaces, so as to seal the corresponding valve opening 41, 42. An illustration is given of piston/cylinder units 46b, 46c for this purpose. For the sake of simplicity, there is no illustration given of a corresponding means for guiding the piston/cylinder unit 46a in relation to the valve housing. Instead of the valve stem being displaced at right angles to its longitudinal extent, the design could also be such that the valve stem 40 is pivoted, by the valve drive 46, about a pivot axis which is located at right angles to its longitudinal extent.

A vacuum valve having a valve plate according to the invention can be designed in different ways. A valve plate according to the invention can also be used for vacuum valves which have just a single valve plate, fastened on a carrier, for the purpose of sealing a valve opening.

KEY TO REFERENCE SIGNS

1 Valve plate
2 Front side
3 Sealing ring
4 Rear side
5 Longitudinal side
6 Narrow side
7 Recess
8 Sloping surface
9 Angle
10 Edge
11 Edge
12 Edge
13 Plane
14 Lug
15 Through-passage bore
15a Internal thread
15b Portion
16 Clamping screw
16a End portion
16b Head
16c Portion
17 Longitudinal center axis
18 Slot
19 Threaded service bore
20 Carrier
21 Connecting screw
22 Aperture
23 Head portion
24a Surface-area portion
24b Surface-area portion
25 Recessed portion
26 Strip
27 Sloping surface
28 Threaded bore
28a Portion
28b Portion
29 Centering protuberance
30 Through-passage bore
31 Upper side
32 Threaded service bore
40 Valve stem
41 First valve opening
42 Second valve opening
43 Valve housing
44 Valve seat
45 Valve seat
46 Valve drive

The invention claimed is:

1. A valve plate configured for sealing a valve opening of a vacuum valve, the valve plate comprising:
   an essentially rectangular valve plate body with relatively long longitudinal sides and relatively short narrow sides;
   a sealing ring made of an elastomer material fitted on a front side of the valve plate body configured for sealing the valve plate in relation to a valve seat which encloses the valve opening;
   at least one recess on a rear side of the valve plate body having an undercut boundary wall which forms a sloping surface which, for fastening the valve plate on a carrier, is configured to be braceable with a sloping surface of the carrier;
   at least one lug that protrudes beyond the rear side of the valve plate body and has a through-passage bore through which a clamping screw is guidable that is adapted to be screwed into a threaded bore of the carrier, for bracing the at least one sloping surface of the valve plate with the at least one sloping surface of the carrier;
   wherein in a side view of the valve plate, as seen in a direction parallel to the longitudinal sides of the valve plate, a straight-line extension of a longitudinal center axis of the through-passage bore, which extends through the lug, extends past the sloping surface at a distance from the rear side of the valve plate body.

2. The valve plate according to claim 1, wherein the at least one recess extends from an edge of the valve plate body which forms one of the longitudinal sides of the valve plate body and, on a side located opposite said edge of the valve plate body, has the boundary wall which forms the sloping surface.

3. The valve plate according to claim 2, wherein, as seen in a view of the rear side of the valve plate, between said edge of the valve plate body from which the recess extends and the boundary wall which forms the sloping surface, the at least one recess is bounded on opposite sides by side edges which run at right angles to the longitudinal sides of the valve plate.

4. The valve plate according to claim 1, wherein the at least one lug projects at right angles from the rear side of the valve plate body.

5. The valve plate according to claim 1, wherein the longitudinal center axis of the through-passage bore through the lug is located parallel to a plane in which the sealing ring of the valve plate is located.

6. The valve plate according to claim 1, wherein the at least one recess comprises a first recess and a second recess, which are spaced apart from one another in a direction of a longitudinal extent of the valve plate body.

7. The valve plate according to claim 6, wherein the at least one lug comprises a first lug and a second lug fitted on the rear side of the valve plate body, the first and a second lugs, are spaced apart from one another in the direction of the longitudinal extent of the valve plate body.

8. The valve plate according to claim 7, wherein the first recess and first lug are arranged in a same first region of the longitudinal extent of the valve plate body, and the second recess and second lug are arranged in a same second region of the longitudinal extent of the valve plate body.

9. The valve plate according to claim 1, further comprising a slot which extends from the recess and is configured for interacting with a centering protuberance arranged on the carrier that, when the valve plate is placed on the carrier, is movable into the slot, and the slot extends from the recess, parallel to the narrow sides of the valve plate body, in a direction of an opposite one of the longitudinal sides of the valve plate body.

10. A closure unit for a vacuum valve, comprising a carrier and at least one of the valve plates according to claim 1 fastened on the carrier, wherein the sloping surface of the at least one recess of the valve plate and the at least one sloping surface of the carrier are braced with one another by at least one clamping screw, which extends through the through-passage bore of the lug and is screwed into a threaded bore of the carrier.

11. The closure unit according to claim 10, wherein the valve plate body butts with the rear side thereof, against a side surface of the carrier and the threaded bore is located in an upper side of the carrier, with the upper side being at right angles to the side surface.

12. The closure unit according to claim 11, wherein the at least one sloping surface of the carrier is arranged on a strip which protrudes beyond the side surface against which the valve plate body butts by way of the rear side thereof.

13. The closure unit according to claim 11, wherein the side surface of the carrier against which the valve plate body butts via the rear side thereof has a first surface-area portion, which adjoins the sloping surface, and a second surface-area portion, which adjoins a narrow side which has the threaded bore, and a recessed portion is located between the first and second surface-area portions.

14. The closure unit according to claim 10, wherein the at least one of the valve plates comprises two of the valve plates which are identical, and a respective one of the valve plates is fitted on each opposite side of the carrier.

15. A vacuum valve comprising a closure unit according to claim 10 that is fitted on a valve stem and is adjustable by a valve drive.

* * * * *